Jan. 18, 1966      H. R. LEWIS ETAL      3,230,403
PRESTRESSED CERAMIC TRANSDUCER
Filed July 14, 1961
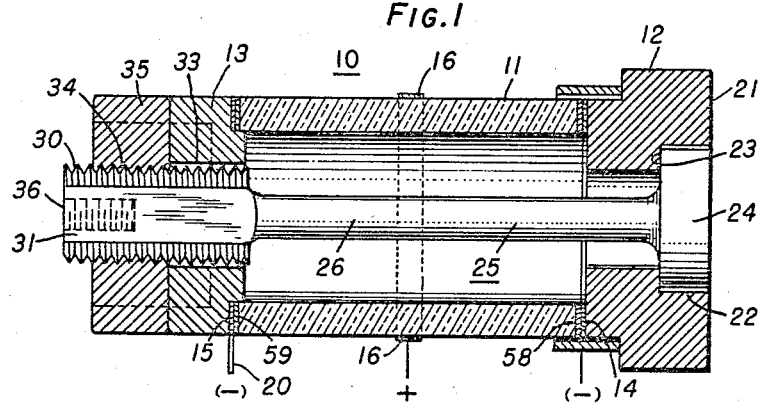
FIG. 1
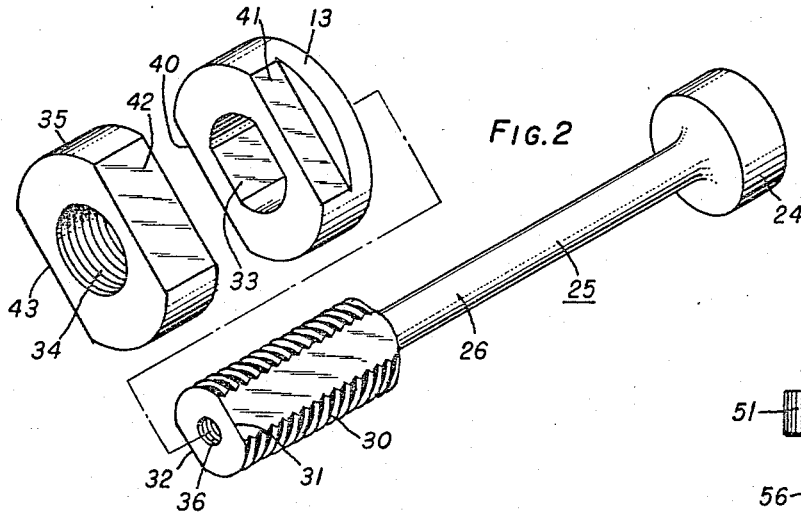
FIG. 2
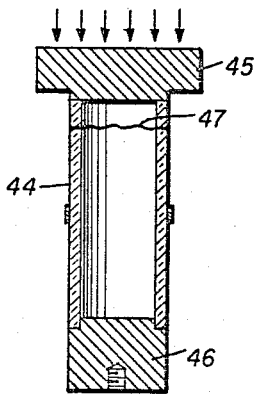
FIG. 3
FIG. 4
INVENTORS
AND H. R. LEWIS
S. N. SURMEIAN
BY John C. Wagner
ATTORNEY

United States Patent Office 3,230,403
Patented Jan. 18, 1966

3,230,403
PRESTRESSED CERAMIC TRANSDUCER
Howard R. Lewis, Burbank, and Stephen N. Surmeian, North Hollywood, Calif., assignors to The Bendix Corporation, North Hollywood, Calif., a corporation of Delaware
Filed July 14, 1961, Ser. No. 124,044
4 Claims. (Cl. 310—8.7)

This invention relates to ceramic transducers, and more particularly to elongated tubular or ring-shaped transducers which are normally subjected to axial compression by the supporting structure and are commonly known in the art as "prestressed transducers."

The piezoelectric properties of certain polycrystalline ceramic materials, such as barium titanate ($BaTiO_3$) and lead zirconate titanate ($PbZrO_3$–$PbTiO_3$), is well recognized. These materials, when formed into tubular transducer elements made up of either a single elongated tubular member or an array of stacked rings, may be used either as a transmitting transducer converting electrical input signals to acoustic power output, or as a receiving element responding to incident acoustic energy to produce an electrical voltage output.

These materials, being ceramic in nature, exhibit the typical structural characteristic of ceramic materials; i.e., having a compressive strength which is many times greater than the tensile strength. Typical examples are in the case of barium titanate having a compressive strength in the order of 50,000 p.s.i. and a tensile strength in the order of 1000 p.s.i. This relatively low tensile allowable is of great significance in a device which may be subjected to omnidirectional loads of high intensity; for example, shock loading when a transducer is dropped into a body of water. In early experimental work it was determined that a transducer subjected to the shock of entry into water or the shocks of mishandling could easily cause the fracture of the ceramic element, whereupon it becomes useless. Several patents have disclosed an advantage in ceramic transducers by introducing axial compression into ring-shaped transducers to maintain a constant compressive load which is above the anticipated tensile loading on the unit. With the introduction of prestressing, the number of failures upon shock has been markedly reduced. Typically the introduction of compressional stress has been accomplished by a pair of end plates, commonly called the head and tail of the transducer, with one or more spring members tensioned between the head and tail and introducing compressive stress into the transducer stack or element. A structure employing a single spring within the stack of transducer rings is disclosed in Patent No. 2,977,572. Patent No. 2,930,912 discloses the prestressing of tubular ceramic transducers by an array of elongated bolts around the periphery of the transducer stack or a central elongated bolt drawing up to the head and tail, all within a tubular housing.

By far, the smallest, lightest and least expensive method of prestressing transducers is through the use of a single elongated bolt extending between the head and tail pieces of a ceramic element stack. This structure avoids the necessity of an outer housing or multiple bolts and allows a large number of transducer assemblies to be placed side by side to form an array having virtually no additional space required than that of the transducer elements themselves.

The necessity of pretressing has been clearly illustrated in tests of virtually identical arrays of transducers when an unstressed array and a second array with the central bolt prestressing were both subjected to drop-entry tests into the water. Every unstressed unit failed by a fracture transverse to the longitudinal axis rendering the units useless, while there were no failures of the prestressed unit subjected to similar tests. Of course, in any array the failure of a single unit limits or destroys its utility, so that the complete elimination of any failures upon impact loading is the only acceptable standard to be met.

It was noted that some failures of the earlier prestressed units (see FIG. 4) were significantly different from those of the unstressed ones. Where the unstressed units have been fractured transverse to the axis, the prestressed units showed fractures beginning at the head or tail and continuing along the length of the element. This form of fracture, it is determined, is typical of a failure in a brittle material in torsion as taught by Frocht, "Strength of Materials," Copyright 1951, on pages 170 through 172. Furthermore, as taught by Frocht, all failures of brittle materials are basically tension failures despite the nature of the load which may be compression, shear or torsion. Consequently, if the failure exhibited by the units appears to be one in torsion, it appeared that the introduction of prestressing through a central axial bolt, despite the care in assembly, normally results in torsional stress within the transducer assembly which ultimately resulted in failure of the units during prestressing or upon impact loading because of the relatively low tensile strength of the ceramic material.

With this understanding of the problems of the art in mind, it is the general object of this invention to provide a prestressed transducer assembly employing only a central axial bolt for prestressing, but one in which the transducer elements are free from the torsional stress which would normally accompany the application of the prestress.

Another object of this invention is to provide such a structure in which no external housing is required for minimization of torsional stress in the units.

Still another object of this invention is to provide a transducer having a minimum number of component parts and minimum volume.

A more complete understanding of this invention may be had from the following detailed description with reference to the drawing in which:

FIG. 1 is the longitudinal section of a transducer employing this invention;

FIG. 2 is an isometric view of the prestressing assembly of the transducer, FIG. 1;

FIG. 3 is an elevational view of a transducer unit showing the typical impact failure without prestressing;

FIG. 4 is an elevational view of a unit employing conventional axial bolt prestressing, illustrating typical failures under impact loading or the application of prestress torque.

Now referring to FIG. 1, a transducer 10 comprises basically a tubular ceramic vibratile element 11, typically of barium titanate or lead zirconate titanate, positioned between a head piece 12 and a tail 13 with metallic rings 14 and 15 in the form of copper mesh rings forming electrical contacts between the element 11 and the head and tail pieces 12 and 13 through a non-conducting bonding material. The element 11 includes a central stripe 16 and end stripes 58 and 59 of conductive material which provide the positive and negative electrical polarity of the element. An extension 20 of the ring 15 forms one terminal of the unit, while a wire soldered to the central stripe 16 forms the second terminal. The prestressing bolt 25 provides the necessary continuity between the end stripes. By the application of electrical signals to the terminals 16 and 20, the element 11 exhibits a piezoelectric effect resulting in longitudinal dimensional changes which are reproduced by the head 12 and introduce longitudinal waves into the medium contacting its outer face 21. The head piece 12 includes an axial opening 22 having an annular seat 23 against which the head 24 of an axial bolt 25 rests to introduce compressive stress into the ceramic element 11. The bolt includes a reduced diameter central portion 26 and threaded end portion 30 having a pair of flat parallel surfaces 31 and 32, one of which appears in FIG. 1. The threaded end portion passes through a broached hole 33 in the tail 13, best seen in FIG. 2, and through a threaded opening 34 in a locking nut 35, in that order. The broached hole 33 is machined such that the flats 31 and 32 of the threaded end portion 30 will just pass through the broached hole 33. The end of bolt 25 includes an inner threaded opening 36 used for mounting the transducer on a supporting wall. This, however, is not a part of this invention.

The head 24 of bolt 25 has a loose fit within the opening 22 through the transducer head 12 and bears against the seat 23. The head is intended to introduce straight compressional stress into the element 11. The threaded portion of the bolt 25 passes through the hole 33 having flat sides corresponding to the surfaces 31 and 32 of the bolt 25 to restrain the bolt 25 from rotation and absorb any torsional stress in the assembly produced upon the tightening of locking nut 35. The tail 13 includes a pair of flat portions 40 and 41 suitable for being held by a wrench or vise, while the nut 35 having similar flat surfaces 42 and 43 is drawn up to the required torque. The bolt 25 preferably is made of a member exhibiting relatively high elongation so that the normal changes in length of the element 11 under signal conditions, as well as any changes in length due to impact loading and differential thermal expansion of the various materials making up the assembly, are insufficient to overcome the compressional stress in the vibratile element 11 by the elongation of the bolt 25. A suitable material for bolt 25 is beryllium copper, which is also an excellent electrical conductor.

A prime advantage of the mounting arrangement illustrated in FIGS. 1 and 2 is that only a single loading member, a bolt 25, is required, and no outer return housing is necessary to absorb the torsional stress. No torsional stress is introduced into the ceramic element since all of the torsion occurs in the threaded portion 30 of the bolt 25. Instead the close broached opening 33 in the tail 13 prevents rotation of the bolt 25 and prevents the transferral of torsional stress to the brittle element 11 upon the tightening of the nut 35.

The advantage of this structure can be illustrated clearly in FIGS. 3 and 4.

FIG. 3 shows the transducer of the same type shown in FIG. 1 having a ceramic vibratile element 44, a radiating head piece 45, and a tail piece 46. The unit has no compressive preloading of the vibratile element. Such units subjected to impact loading on the outer face of head 45, generally indicated by the arrows, suffer from fractures at the head end of the transducer element 44, illustrated by the crack 47. Such a crack renders the element useless and severs the radiating head 45 from the remainder of the body 44.

Improvement in the resistance to impact loading is encountered in the structure of FIG. 4. The unit of FIG. 4 is identical to that of FIG. 3, including a vibratile element 50 with a head 51 and a tail 52 with the exception of the addition of an axial loading screw 53 secured to the tail 52 by such means as threads 54 and drawn up by a slotted screwdriver at the slotted flat screw head 55. During the prestressing operation, both the head 51 and tail 52 are firmly clamped to eliminate relative radial displacement between them. Complete elimination of all radial forces however, was difficult to obtain practically and consistently. The inability to achieve this resulted in failures upon impact loading as well as during the prestressing operation, shown by the fracture 56 which extends from the head piece 51 along the length of the element 50. Occasionally the fracture would curve along the length of the element 50 at a 45° angle with respect to the axis of the transducer. This is illustrative of the torsional failure in the unit 50.

Transducers properly employing this invention encountered no failures of either type upon impact loading or prestressing. The characteristic of the mounting structure for transducers in accordance with this invention is that one end of the transducer is free of any torque-transmitting contact between the loading structure and the brittle element. In the absence of even the simplest torque-transmitting arrangement, such as a conventional nut on the end of a threaded bolt, the unit will be free of torsional stress which otherwise could cause failure of the units under relatively low impact loads because of the presence of torsional stresses which were introduced during application of the prestressing torque.

Although for the purpose of explaining the invention a particular embodiment thereof has been shown and described, obvious modifications will occur to a person skilled in the art, and we do not desire to be limited to the exact details shown and described.

We claim:

1. A transducer comprising a tubular ceramic vibratile element having a compressive strength several times its tensile strength,
    a pair of spaced electrodes on said element,
    a threaded member extending through the opening in said tubular vibratile element and including an enlarged head portion for applying compressive force to the first end of said vibratile element and a portion having a non-circular cross-section,
    means adjacent to the second end of said vibratile element having a non-circular internal surface engageable with said non-circular portion of said threaded member to prevent radial movement of said means while permitting axial movement thereof, and
    a nut including threads engaging said threaded member for applying a compressive force to said last named means and to said vibratile element.

2. A prestressed transducer comprising a tubular vibratile element of ceramic material having a compressive strength several times its tensile strength,
    a pair of spaced electrodes on said element,
    a first end member bearing against one annular end of said tubular vibratile element,
    a second end member having a central opening with a non-circular internal surface bearing against the opposite annular end of said vibratile element,
    a threaded member bearing against said first end member and extending through the central openings of said vibratile member and said second end member and having a non-circular external surface cooperatively engaged with said non-circular internal surface, and
    a nut bearing against said second end member engaging said threaded member for tensioning said threaded member to introduce compressional stress into said vibratile element.

3. A prestressed transducer comprising a tubular vibratile element of ceramic material having a compressive strength several times its tensile strength,
    a pair of spaced electrodes on said element,
    a head piece positioned at one end of said tubular vibratile element for transmitting longitudinal vibrations between said vibratile element and the medium contacting said head piece,
    a tail piece positioned adjacent to the opposite end of said vibratile element from said head piece,
    a tension member extending between said head and tail pieces and including a portion having a non-circular cross-section and threaded portion extending out of said vibratile element beyond said tail piece,
    said tail piece including a non-circular internal surface bearing against the non-circular portion of said tension member, preventing said tension member from rotation, and a nut engaging the threaded portion of said tension member for causing axial movement of said tail piece against said vibratile element and introducing compressional stress into said vibratile element.

4. A prestressed transducer comprising a tubular vibratile element of ceramic material having a compressive strength several times its tensile strength,
   a pair of spaced electrodes on said element,
   a head piece positioned at one end of said tubular element for transmitting longitudinal vibrations between said vibratile element and the medium contacting said head piece,
   a tail piece positioned at the opposite end of said tubular element, said tail piece including a central aperture therethrough of noncircular cross-section,
   a tension member extending from said head piece through the central opening of said vibratile element and through the noncircular opening in said tail piece, the portion of said tension member in the noncircular opening conforming to the shape of the opening whereby said tension member is restrained from rotation relative to said tail piece,
   the portion of said tension member extending through said tail piece including a threaded region, and
   threaded means engaging the threaded region of said tension member for introducing compressive stress into said vibratile element.

References Cited by the Examiner
UNITED STATES PATENTS
2,788,454    4/1957    Zapponi _____ 310—8.7

ORIS L. RADER, *Primary Examiner.*
MILTON O. HIRSHFIELD, *Examiner.*